US012625538B2

(12) United States Patent
Kolesnikov et al.

(10) Patent No.: US 12,625,538 B2
(45) Date of Patent: May 12, 2026

(54) SESSION PRESERVATION FOR AUTOMATED POWER MANAGEMENT

(71) Applicant: Citrix Systems, Inc., Fort Lauderdale, FL (US)

(72) Inventors: Yuri Kolesnikov, Raleigh, NC (US); Adith Jayakar Hegde, Parkland, FL (US); Nitin Mehta, Fort Lauderdale, FL (US); William Thomas George Charnell, Great Missenden (GB); Leo C. Singleton, IV, Fort Lauderdale, FL (US); Balasubramanian Swaminathan, Parkland, FL (US)

( * ) Notice: Subject to any disclaimer, the term of this patent is extended or adjusted under 35 U.S.C. 154(b) by 284 days.

(21) Appl. No.: 17/814,015

(22) Filed: Jul. 21, 2022

(65) Prior Publication Data

US 2024/0028098 A1 Jan. 25, 2024

(51) Int. Cl.
*G06F 1/32* (2019.01)
*G06F 1/3206* (2019.01)
*G06F 1/3287* (2019.01)

(52) U.S. Cl.
CPC .......... *G06F 1/3206* (2013.01); *G06F 1/3287* (2013.01)

(58) Field of Classification Search
CPC ............................. G06F 1/3206; G06F 1/3287
See application file for complete search history.

(56) References Cited

U.S. PATENT DOCUMENTS

| | | | |
|---|---|---|---|
| 8,990,809 B1 | 3/2015 | Jacob | |
| 10,789,195 B1 | 9/2020 | Jha | |
| 2008/0133687 A1 | 6/2008 | Fok | |
| 2012/0227058 A1* | 9/2012 | Hunt ........................ | G06F 8/71 |
| | | | 719/318 |
| 2013/0167147 A1 | 6/2013 | Corrie | |
| 2018/0341507 A1* | 11/2018 | Inbaraj ................... | G06F 9/452 |
| 2019/0025903 A1 | 1/2019 | Mehta | |
| 2020/0042411 A1 | 2/2020 | Krishnan | |
| 2020/0209946 A1 | 7/2020 | Visconti | |

OTHER PUBLICATIONS

Citrix, "Autoscale", May 31, 2022, 10 pages.
"Folder Redirection, Offline Files, and Roaming User Profiles overview", https://docs.microsoft.com/en-us/windows-server/storage/folder-redirecti . . . , Dec. 23, 2021, 9 pages.

(Continued)

*Primary Examiner* — Stefan Stoynov

(57) ABSTRACT

According to one aspect of the disclosure, a method comprises: receiving, by a first computing device, information about one or more applications running on a second computing device, the second computing device being one of a plurality of computing devices managed by the first computing device; determining, by the first computing device, whether to power down the second computing device based at least on an analysis of the information about the one or more applications; and responsive to a determination to shutdown the second computing device, sending, by the first computing device, a command to shutdown the second computing device, wherein the second computing device is configured to save state of the one or more applications to a storage device accessible to the plurality of computing devices.

17 Claims, 8 Drawing Sheets

800

(56)          References Cited

OTHER PUBLICATIONS

Anonymous: "Citrix Virtual Apps and Desktops service—Autoscale", Oct. 15, 2020 (Oct. 15, 2020), pp. 1-25, XP055902816, Retrieved from the Internet: URL:https://web.archive.org/web/20201016090927/https://docs.citrix.com/en-us/citrix-virtual-apps-desktops-service/manage-deployment/autoscale.html [retrieved on Mar. 18, 2022].

Anonymous: "Local Host Cache", Dec. 3, 2020 (Dec. 3, 2020), pp. 1-8, XP055902715, Retrieved from the Internet: URL:https://web.archive.org/web/20201203224037/https://docs.citrix.com/en-us/citrix-virtual-apps-desktops-service/manage-deployment/local-host-cache.html [retrieved on Mar. 17, 2022].

Augustin Jose: "Tech Preview: Power operations during Local Host Cache (LHC) mode", Aug. 31, 2020 (Aug. 31, 2020), pp. 1-6, XP055902853, Retrieved from the Internet: URL:https://www.citrix.com/blogs/2020/08/31/tech-preview-power-operations-during-local-host-cache-lhc-mode/ [retrieved on Mar. 18, 2022].

Carl Setterlund, "Citrix User Profile Management", https://www.techtarget.com/searchvirtualdesktop/definisition/Citrix-User-P . . . , printed Jun. 10, 22, 3 pages.

Citrix, "Profile Management", https://www.citrix.com/go/jmp/upm.html, printed Apr. 25, 2022, 3 pages.

International Search Report and Written Opinion issued in App. No. PCT/US2021/061370, mailing date Mar. 28, 2022, 16 pages.

Kaviani Nima: "Health Checking Applications in the Cloud—Part I Cloud Foundry", Dec. 8, 2017 (Dec. 8, 2017), pp. 1-9, XP055902814, Retrieved from the Internet: URL:https://www.cloudfoundry.org/blog/health-check-apps-cloud-part-1/ [retrieved on Mar. 18, 2022].

Office Action dated Feb. 2, 2022 for U.S. Appl. No. 17/125,251 (pp. 1-16).

Pacquette, "Scaling Azure Functions from Consumption Plan to Premium Plan (and back again)" https://www.davepaquette.com/archive/2020/05/20/scalling-azure-functions-from-consumption-plan-to-premium-hosting-plan.aspx; May 23, 2020 (7 Pages).

U.S. Final Office Action dated Jun. 4, 2021 for U.S. Appl. No. 17/125,251; 15 pages.

U.S. Non-Final Office Action dated Feb. 19, 2021 for U.S. Appl. No. 17/125,251; 14 pages.

* cited by examiner

500

800

SESSION PRESERVATION FOR AUTOMATED POWER MANAGEMENT

BACKGROUND

Virtual desktop infrastructure (VDI) and desktop as a service (DaaS) systems enable users to access virtual applications and desktops hosted on remote machines using various types of client devices. The host machines can include physical desktop computers and servers within an on-premises (or "on-prem") infrastructure and/or or virtual machines (VMs) running on top of an on-prem hypervisor or within a cloud-based system. A VDI/DaaS system can include a management service—which can be hosted on-premises or in a cloud-bases system—that is responsible for managing user access, connection brokering and optimization, and session management. Among other features, the management service may also power manage the host machines by, for example, issuing commands to power on host machines on demand to ensure the availability of virtual applications/desktops.

To access a virtual application or desktop, a user can use a client device to initially connect to virtual application/desktop running on host machine selected and power managed by the management service. This is referred to as establishing a session. During the session, the user may perform various actions (or "work") that alter the state of a single virtual application or of multiple applications running within a virtual desktop. For example, the user may create new documents, view/edit existing documents, arrange application windows, load or more websites within web browser, etc. During the session, the client device may be disconnected from the host machine (e.g., in response to a network interruption, user action, etc.) and the user can subsequently reconnect to the virtual application/desktop using the same client device or another client device and resume work with the same application state. That is, virtual applications and desktops may be stateful in nature. When the user has completed their work, the user can choose to save certain application state (e.g., documents created/edited during the session) to persistent storage (e.g., network-attached storage (NAS), cloud-based storage, a file share, etc.) and log off of the virtual application/desktop, thereby ending the session.

SUMMARY

It is appreciated herein that the stateful nature of virtual application/desktop sessions presents a challenge for automatically powering down host machines based on a schedule, load, or other criteria (e.g., for the purpose of reducing energy consumption or cloud system hosting costs). For example, powering down a machine running one or more virtual application/desktop sessions—whether in a connected or disconnected state—may result in loss of work (e.g., unsaved application state). Currently, manual intervention and session monitoring may be required to safely power down a host machine, relying on users of that machine to log off all of their virtual application/desktop sessions running thereon. There is a need for structures and techniques that enable automated power management within VDI/DaaS systems without loss of work. In particular, there is a need for automatically powering down host machines in a forceful/aggressive manner without loss of work.

Disclosed embodiments enable automated power management within VDI/DaaS systems using session preservation and migration between host machines. In some embodiments, host machines can be configured to persist application state associated with particular user sessions to storage that is shared between host machines (e.g., NAS, cloud-based storage, a file share, etc.) and to restore the application state from the shared storage. This allows, for example, for the application state of a session hosted on a powered-down machine to be restored on another machine selected to host the session, including a machine that may have a different operating system (OS) image. Disclosed embodiments allow virtual application/desktop sessions to be migrated between host machines in a seamless or near-seamless fashion. In some embodiments, automated power management policies can be configured to exempt machines running specific applications from power-off actions. In some embodiments, sessions and/or host machines can be exempted from power-off actions in response to user requests.

The power management techniques and structures disclosed herein find application in many types of systems are not limited to VDI/DaaS systems.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the following claims.

BRIEF DESCRIPTION OF THE DRAWINGS

The manner of making and using the disclosed subject matter may be appreciated by reference to the detailed description in connection with the drawings, in which like reference numerals identify like elements.

The drawings are not necessarily to scale, or inclusive of all elements of a system, emphasis instead generally being placed upon illustrating the concepts, structures, and techniques sought to be protected herein.

DETAILED DESCRIPTION

Figure 1:
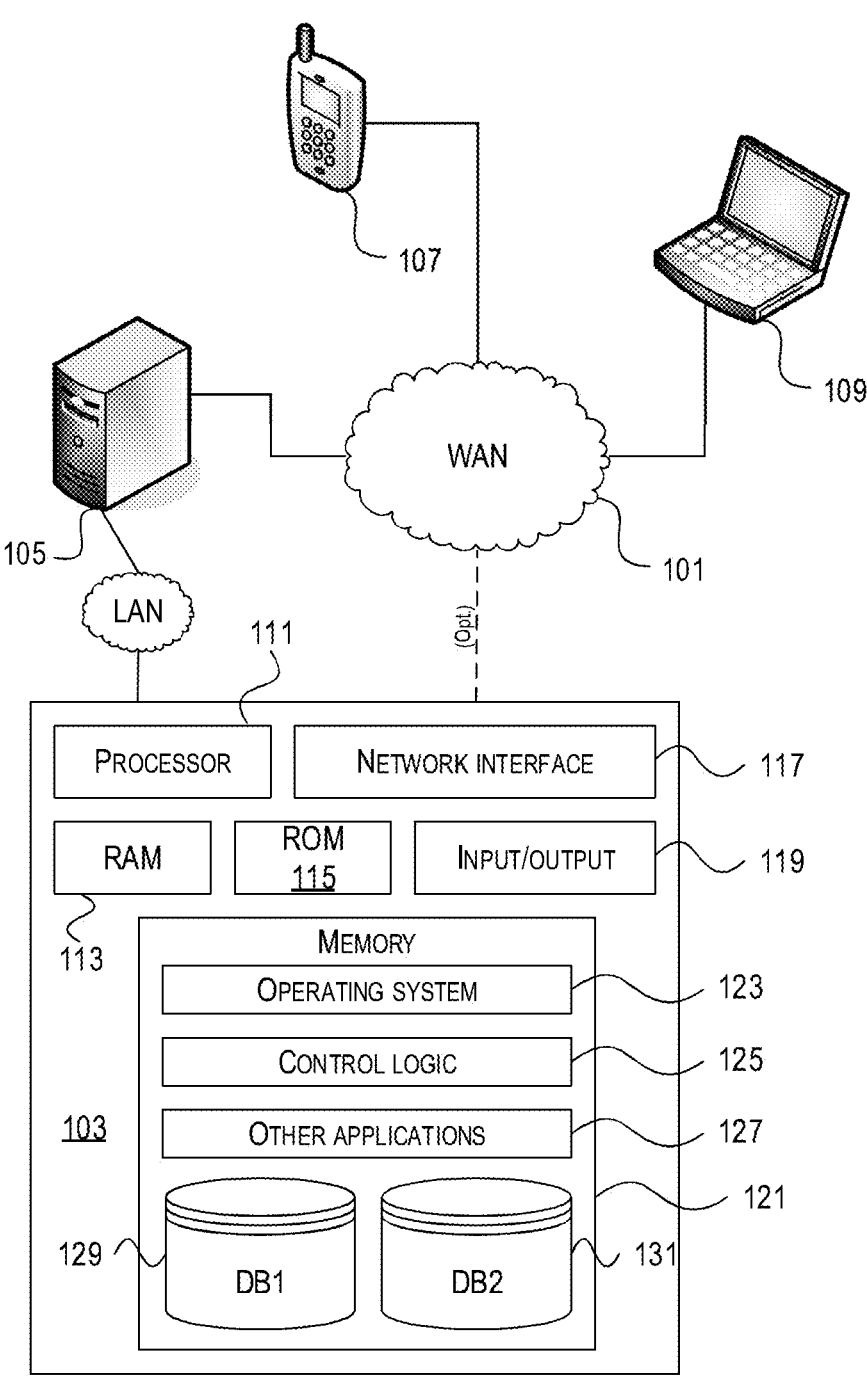
FIG. 1 depicts an illustrative computer system architecture that may be used in accordance with one or more illustrative aspects of the concepts described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects of the concepts described herein in a standalone and/or networked environment. Various network node devices 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topologies and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components and devices which make up the system of FIG. 1 may include data server 103, web server 105, and client computers 107, 109. Data server 103 provides overall access, control and administration of databases and control software for performing one or more illustrative aspects of the concepts described herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used in the system architecture and data processing device of FIG. 1, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) interfaces 119 may include a variety of interface units and drives for reading, writing, displaying, and/or printing data or files. Memory 121 may store operating system software 123 for controlling overall operation of the data server 103, control logic 125 for instructing data server 103 to perform aspects of the concepts described herein, and other application software 127 providing secondary, support, and/or other functionality which may or might not be used in conjunction with aspects of the concepts described herein. The control logic 125 may also be referred to herein as the data server software. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects of the concepts described herein. Memory 121 may include, for example, a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, and 109 may have similar or different architecture as described with respect to data server 103. Those of skill in the art will appreciate that the functionality of data server 103 (or device 105, 107, or 109) as described herein may be spread across multiple data processing devices, for example, to distribute processing load across multiple computers, to segregate transactions based on geographic location, user access level, quality of service (QoS), etc.

One or more aspects of the concepts described here may be embodied as computer-usable or readable data and/or as computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution or may be written in a scripting language such as (but not limited to) Hypertext Markup Language (HTML) or Extensible Markup Language (XML). The computer executable instructions may be stored on a computer readable storage medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source node and a destination node (e.g., the source node can be a storage or processing node having information stored therein which information can be transferred to another node referred to as a "destination node"). The media can be transferred in the form of electromagnetic waves traveling through signal-conducting media such as metal wires, optical fibers, and/or wireless transmission media (e.g., air and/or space). Various aspects of the concepts described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects of the concepts described herein, and such data structures are contemplated within the scope of computer executable instructions and computer-usable data described herein.

Figure 2:
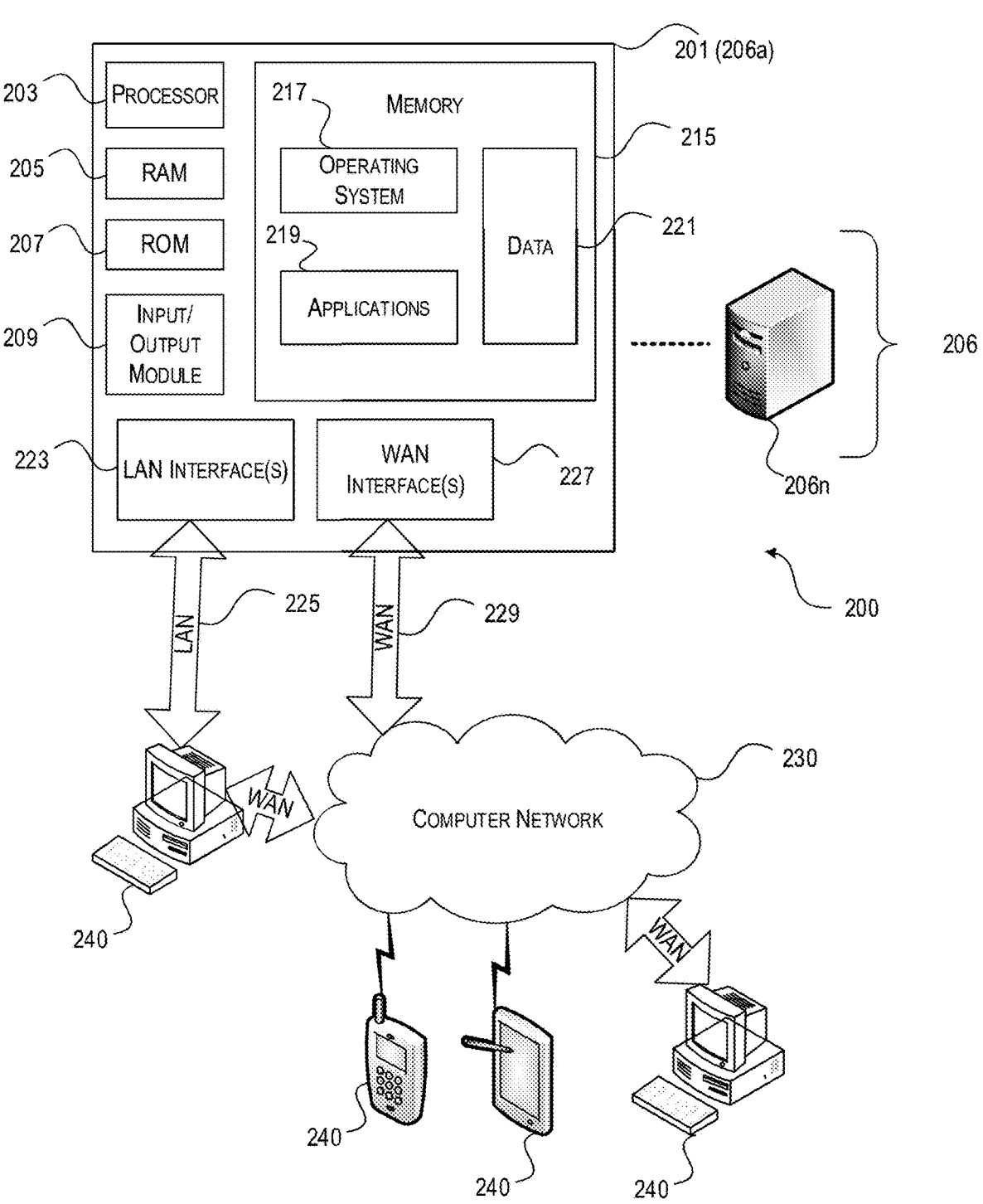
FIG. 2 depicts an illustrative remote-access system architecture that may be used in accordance with one or more illustrative aspects of the concepts described herein.

With further reference to FIG. 2, one or more aspects of the concepts described herein may be implemented in a remote-access environment. FIG. 2 depicts an example system architecture including a computing device 201 in an illustrative computing environment 200 that may be used according to one or more illustrative aspects of the concepts described herein. Computing device 201 may be used as a server 206a in a single-server or multi-server desktop virtualization system (e.g., a remote access or cloud system) configured to provide VMs for client access devices. The computing device 201 may have a processor 203 for controlling overall operation of the server and its associated components, including RAM 205, ROM 207, input/output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all the elements described above with respect to the data server 103 or computing device 201. The network connections depicted in FIG. 2 include a local area network (LAN) 225 and a wide area network (WAN) 229 but may also include other networks. When used in a LAN networking environment, computing device 201 may be connected to the LAN 225 through an adapter or network interface 223. When used in a WAN networking environment, computing device 201 may include a modem or other wide area network interface 227 for establishing communications over the WAN 229, such as to computer network 230 (e.g., the Internet). It will be appreciated that the network connections shown are illustrative and other means of establishing a communication link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects of the concepts described herein may also be operational with numerous other general purpose or special purpose computing system environments or configurations. Examples of other computing systems, environments, and/or configurations that may be suitable for use with aspects of the concepts described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more terminals 240 may be in communication with one or more servers 206a-206n (generally referred to herein as "server(s) 206"). In one embodiment, the computing environment 200 may include a network appliance installed between the server(s) 206 and terminals 240. The network appliance may manage client/server connections, and in some cases can load balance client connections amongst a plurality of back-end servers 206.

The terminals 240 may in some embodiments be referred to as a single computing device or a single group of client computing devices, while server(s) 206 may be referred to as a single server 206 or a group of servers 206. In one embodiment, a single terminal 240 communicates with more than one server 206, while in another embodiment a single server 206 communicates with more than one terminal 240. In yet another embodiment, a single terminal 240 communicates with a single server 206.

A terminal 240 can, in some embodiments, be referred to as any one of the following non-exhaustive terms: client machine(s); client(s); client computer(s); client device(s); client computing device(s); local machine; remote machine; client node(s); endpoint(s); or endpoint node(s). The server 206, in some embodiments, may be referred to as any one of the following non-exhaustive terms: server(s), local machine; remote machine; server farm(s), or host computing device(s).

In one embodiment, the terminal 240 may be a VM. The VM may be any VM, while in some embodiments the VM may be any VM managed by a Type 1 or Type 2 hypervisor, for example, a hypervisor developed by Citrix Systems, IBM, VMware, or any other hypervisor. In some aspects, the VM may be managed by a hypervisor, while in other aspects the VM may be managed by a hypervisor executing on a server 206 or a hypervisor executing on a terminal 240.

Some embodiments include a terminal 240 that displays application output generated by an application remotely executing on a server 206 or other remotely located machine. In these embodiments, the terminal 240 may execute a VM receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Fort Lauderdale, Florida; or the Remote Desktop Protocol (RDP) manufactured by Microsoft Corporation of Redmond, Washington.

A remote computing environment may include more than one server 206a-206n logically grouped together into a server farm 206, for example, in a cloud computing environment. The server farm 206 may include servers 206a-206n that are geographically dispersed while logically grouped together, or servers 206a-206n that are located proximate to each other while logically grouped together. Geographically dispersed servers 206a-206n within a server farm 206 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments, the server farm 206 may be administered as a single entity, while in other embodiments the server farm 206 can include multiple server farms.

In some embodiments, a server farm 206 may include servers that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server, a master application server, a server executing an active directory, or a server executing an application acceleration program that provides firewall functionality, application functionality, or load balancing functionality. Other server types may also be used.

Some embodiments include a first server 206a that receives requests from a terminal 240, forwards the request to a second server 206b (not shown), and responds to the request generated by the terminal 240 with a response from the second server 206b (not shown). First server 206a may acquire an enumeration of applications available to the terminal 240 as well as address information associated with an application server 206 hosting an application identified within the enumeration of applications. First server 206a can present a response to the client's request using a web interface and communicate directly with the terminal 240 to provide the terminal 240 with access to an identified application. One or more terminals 240 and/or one or more servers 206 may transmit data over network 230, e.g., network 101.

Figure 3:
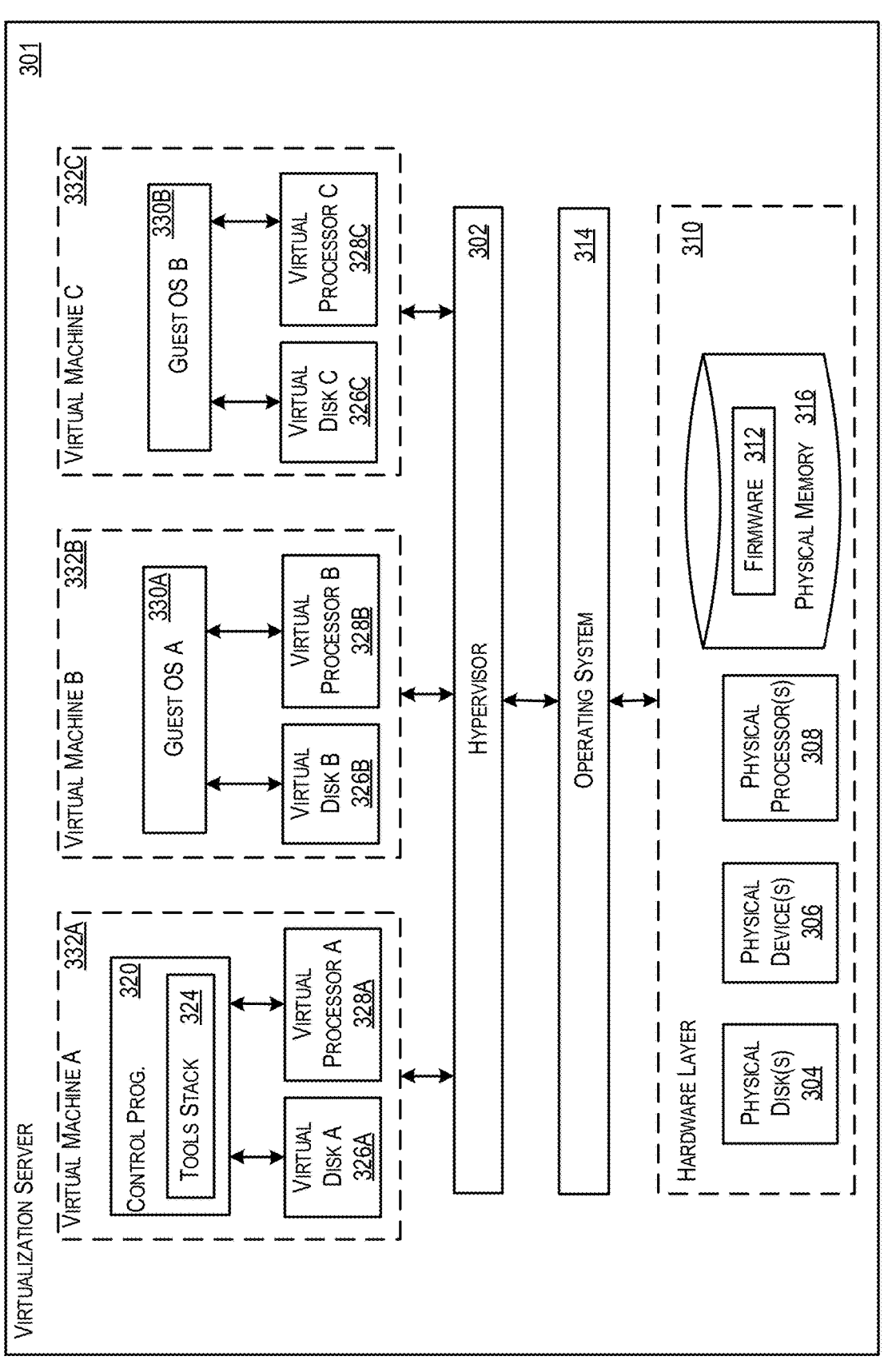
FIG. 3 depicts an illustrative virtualized (hypervisor) system architecture that may be used in accordance with one or more illustrative aspects of the concepts described herein.

FIG. 3 shows a high-level architecture of an illustrative application virtualization system. As shown, the application virtualization system may be single-server or multi-server system, or cloud system, including at least one virtualization server 301 configured to provide virtual desktops and/or virtual applications to one or more terminals 240 (FIG. 2). As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an operating system running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer 310 that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more VMs 332A-C (generally 332). Each VM 332 may have a virtual disk 326A-C and a virtual processor 328A-C. In some embodiments, a first VM 332A may execute, using a virtual processor 328A, a control program 320 that includes a tools stack 324. Control program 320 may be referred to as a control VM, Dom0, Domain 0, or other VM used for system administration and/or control. In some embodiments, one or more VMs 332B-C can execute, using a virtual processor 328B-C, a guest operating system 330A-B.

Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

In some embodiments, hypervisor 302 may be a program executed by processors 308 on virtualization server 301 to create and manage any number of VMs 332. Hypervisor 302 may be referred to as a VM monitor, or platform virtualization software. In some embodiments, hypervisor 302 can be any combination of executable instructions and hardware that monitors VMs executing on a computing machine.

Hypervisor 302 may be Type 2 hypervisor, where the hypervisor executes within an operating system 314 executing on the virtualization server 301. VMs may execute at a level above the hypervisor. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301 and may include program data stored in the physical memory 316.

Hypervisor 302, in some embodiments, can provide virtual resources to operating systems 330 or control programs 320 executing on VMs 332 in any manner that simulates the operating systems 330 or control programs 320 having direct access to system resources. System resources can include, but are not limited to, physical devices 306, physical disks 304, physical processors 308, physical memory 316, and any other component included in virtualization server 301 hardware layer 310. Hypervisor 302 may be used to emulate virtual hardware, partition physical hardware, virtualize physical hardware, and/or execute VMs that provide access to computing environments. In still other embodiments, hypervisor 302 may control processor scheduling and memory partitioning for a VM 332 executing on virtualization server 301. In some embodiments, virtualization server 301 may execute a hypervisor 302 that creates a VM platform on which guest operating systems may execute. In these embodiments, the virtualization server 301 may be referred to as a host server. An example of such a virtualization server is the Citrix Hypervisor provided by Citrix Systems, Inc., of Fort Lauderdale, Florida.

Hypervisor 302 may create one or more VMs 332B-C (generally 332) in which guest operating systems 330 execute. In some embodiments, hypervisor 302 may load a VM image to create a VM 332. In other embodiments, the hypervisor 302 may execute a guest operating system 330 within VM 332. In still other embodiments, VM 332 may execute guest operating system 330.

In addition to creating VMs 332, hypervisor 302 may control the execution of at least one VM 332. In other embodiments, hypervisor 302 may present at least one VM 332 with an abstraction of at least one hardware resource provided by the virtualization server 301 (e.g., any hardware resource available within the hardware layer 310). In other embodiments, hypervisor 302 may control the way VMs 332 access physical processors 308 available in virtualization server 301. Controlling access to physical processors 308 may include determining whether a VM 332 should have access to a processor 308, and how physical processor capabilities are presented to the VM 332.

As shown in FIG. 3, virtualization server 301 may host or execute one or more VMs 332. A VM 332 is a set of executable instructions that, when executed by a processor 308, may imitate the operation of a physical computer such that the VM 332 can execute programs and processes much like a physical computing device. While FIG. 3 illustrates an embodiment where a virtualization server 301 hosts three VMs 332, in other embodiments virtualization server 301 can host any number of VMs 332. Hypervisor 302, in some embodiments, may provide each VM 332 with a unique virtual view of the physical hardware, memory, processor, and other system resources available to that VM 332. In some embodiments, the unique virtual view can be based on one or more of VM permissions, application of a policy engine to one or more VM identifiers, a user accessing a VM, the applications executing on a VM, networks accessed by a VM, or any other desired criteria. For instance, hypervisor 302 may create one or more unsecure VMs 332 and one or more secure VMs 332. Unsecure VMs 332 may be prevented from accessing resources, hardware, memory locations, and programs that secure VMs 332 may be permitted to access. In other embodiments, hypervisor 302 may provide each VM 332 with a substantially similar virtual view of the physical hardware, memory, processor, and other system resources available to the VMs 332.

Each VM 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each VM 332 with a unique view of the physical disks 304. Thus, in these embodiments, the particular virtual disk 326 included in each VM 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all the same characteristics of at least one physical processor 308. In other embodiments, virtual processor 328 provides a modified view of physical processors 308 such that at least some of the characteristics of the virtual processor 328 are different than the characteristics of the corresponding physical processor 308.

Figure 4:
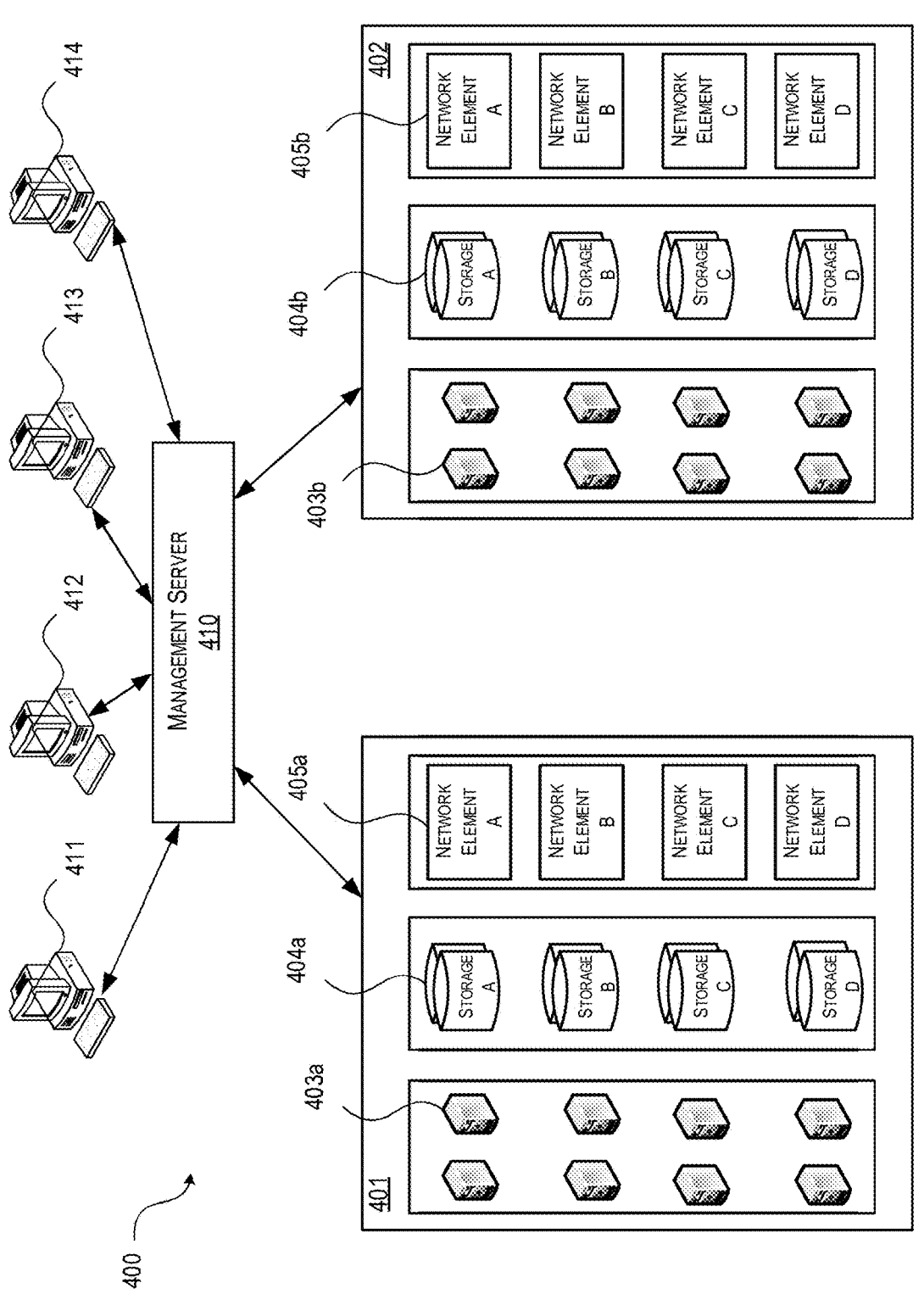
FIG. 4 depicts an illustrative cloud-based system architecture that may be used in accordance with one or more illustrative aspects of the concepts described herein.

With further reference to FIG. 4, some aspects of the concepts described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred to herein as "host servers 403"), storage resources 404a-404b (generally referred to herein as "storage resources 404"), and network resources 405a-405b (generally referred to herein as "network resources 405")) of the cloud system.

Management server 410 may be implemented on one or more physical servers. The management server 410 may include, for example, a cloud computing platform or solution, such as APACHE CLOUDSTACK by Apache Software Foundation of Wakefield, MA, among others. Management server 410 may manage various computing resources, including cloud hardware and software resources, for example, host servers 403, storage resources 404, and network resources 405. The cloud hardware and software resources may include private and/or public components. For example, a cloud environment may be configured as a private cloud environment to be used by one or more customers or client computers 411-414 and/or over a private network. In other embodiments, public cloud environments or hybrid public-private cloud environments may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy VMs within the cloud environment. Client computers 411-414 may connect to management server 410 via the Internet or some other communication network and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage VMs and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain client computers 411-414 may be related, for example, different client computers creating VMs on behalf of the same end user, or different users affiliated with the same company or organization. In other examples, certain client computers 411-414 may be unrelated, such as users affiliated with different companies or organizations. For unrelated clients, information on the VMs or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud computing resources. For example, zone 401 may be a first cloud datacenter located in California and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud environment (e.g., client computers 411-414) might or might not be aware of the distinctions between zones. For example, an end user may request the creation of a VM having a specified amount of memory, processing power, and network capabilities. The management server 410 may respond to the user's request and may allocate resources to create the VM without the user knowing whether the VM was created using resources from zone 401 or zone 402. In other examples, the cloud system may allow end users to request that VMs (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more host servers 403, such as the virtualization servers 301 (FIG. 3), which may be configured to create and host VM instances. The physical network resources in a cloud zone 401 or 402 may include one or more network resources 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment 400 shown in FIG. 4 also may include a virtualization layer (e.g., as shown in FIGS. 1-3) with additional hardware and/or software resources configured to create and manage VMs and provide other services to customers using the physical resources in the cloud environment. The virtualization layer may include hypervisors, as described above in connection with FIG. 3, along with other components to provide network virtualizations, storage virtualizations, etc. The virtualization layer may be as a separate layer from the physical resource layer or may share some or all the same hardware and/or software resources with the physical resource layer. For example, the virtualization layer may include a hypervisor installed in each of the host servers 403 with the physical computing resources. Known cloud systems may alternatively be used, e.g., WINDOWS AZURE (Microsoft Corporation of Redmond, Washington), AMAZON EC2 (Amazon.com Inc. of Seattle, Washington), IBM BLUE CLOUD (IBM Corporation of Armonk, New York), or others.

Figure 5:
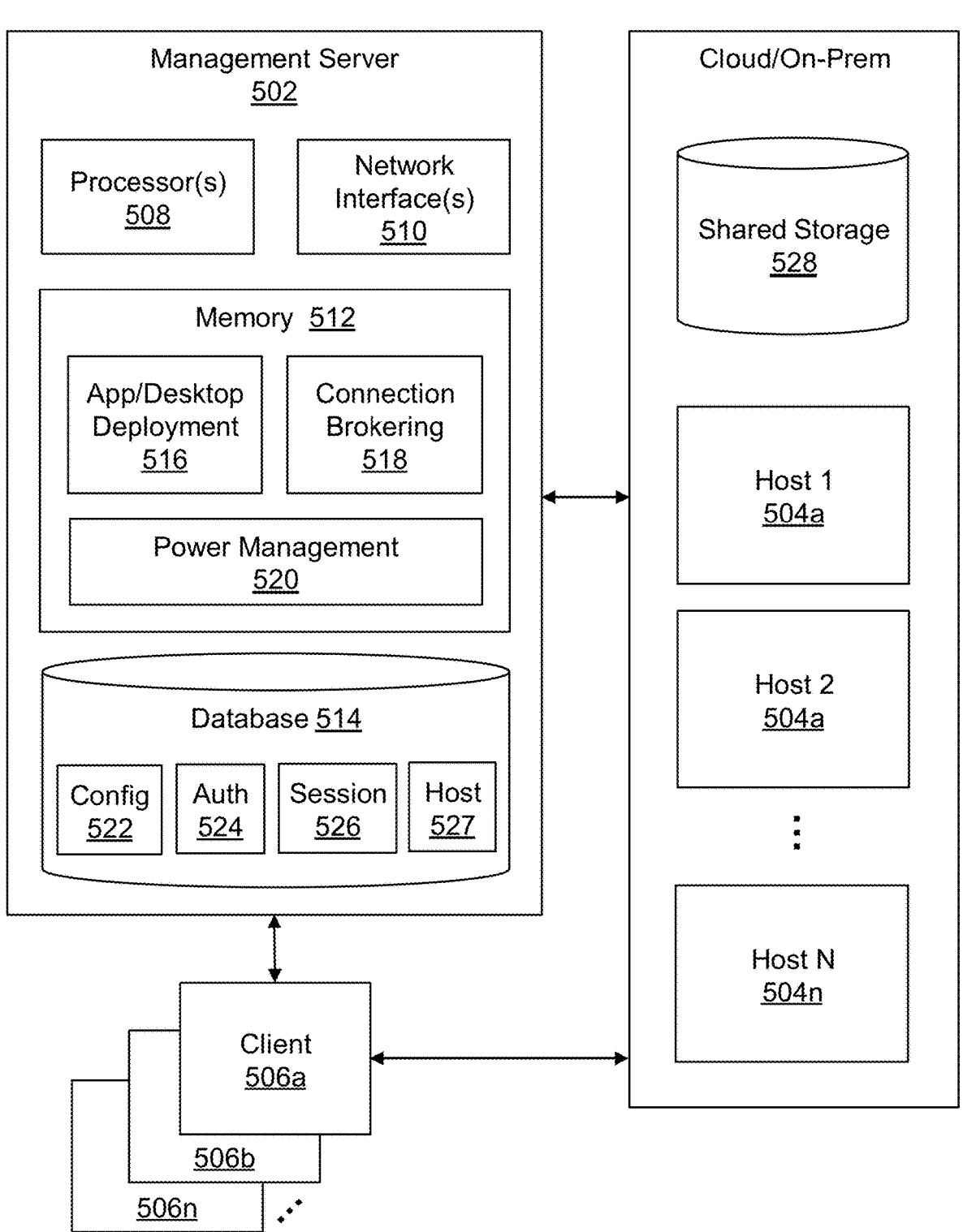
FIG. 5 is a network diagram of an illustrative computer system that provides access to virtual applications and desktops while enabling automated power management using session preservation and migration between host machines, according to some embodiments.

Turning to FIG. 5, a computer system 500 can provide access to virtual applications and desktops while enabling automated power management using session preservation and migration between host machines, according to some embodiments. The illustrative system 500 includes a management server 502, one or more host machines 504*a*, 504*b*, . . . , 504*n* (504 generally), and or more clients 506*a*, 506*b*, . . . , 506*n* (506 generally). In some embodiments, management server 502 and host machines 504 may comprise, be part of, a VDI or DaaS environment.

Clients 506 can communicate with management server 502 and host machines 504 via one or more computer networks (not shown) and management server 502 can communicate with hosts 504 via the same or default computer network(s). The computer network(s) can may comprise any type and form of network, including a local area network (LAN), medium or metropolitan area network (MAN), wide area network (WAN) such as the Internet, or a combination of these or other networks. In some embodiments, management server 502 and/or host machines 504 may be behind a firewall, relative to clients 506, and clients 506 may communicate with management server 502 and/or host machines via a gateway device (not shown).

Host machines 504 can be configured to run virtual applications and desktops deployed by the management server 502 and accessed by clients 506 (i.e., by end users using clients 506). In some embodiments, host machines 504 may correspond to physical desktop computers and/or servers within an on-premises (or "on-prem") infrastructure. In some embodiments, host machines 504 may correspond to VMs that run on top of a hypervisor that is hosted on-prem, or that run within a cloud-based system. Host machines 504 can include hardware and/or software to interoperate with management server 502 to provide clients 506 with access to virtual applications/desktops. For example, as discussed below in the context of FIG. 6, individual ones of host machines 504 can include an agent—sometimes referred to as a virtual delivery agent (VDA)—configured to register the host machine with the management server 502, manage connections between the host machine and one or more clients 506, communicate session information to management server 502 (e.g., information identifying which applications are running within a session), communicate operating system metrics of the host machine (e.g., processor usage, memory usage, disk usage, etc.) to management server 502, and/or perform various other VDI/DaaS-related functions.

Management server 502—sometimes referred to as a delivery controller—may correspond to one or more physical servers and/or virtual machine-based servers configured to run various services for providing clients 506 with access to virtual applications and desktops running on host machines 504.

System 500 may be configured for us by a single organization (e.g., company) or by multiple organizations, where a given organization can have an arbitrary number of end users. In some embodiments, a single instance of management server 502 may operate to provide virtual application/desktop access to multiple different organizations. In some embodiments, different instances of management server 502 may be operated for different organizations. In some embodiments, host machines 504 for multiple different organizations may be deployed within the same cloud-based system (e.g., within different tenants of the same cloud-based system). In some embodiments, a single instance of management server 502 may deploy, and provide access to, virtual applications/desktops within multiple different cloud-based systems and/or on-prem infrastructures.

Management server 502 may comprise one or more processors 508, which may comprise, for example, single core processors, multi-core processors, virtual processors provided as part of a virtual machine executed by one or more physical machines, graphics processing units (GPUs), or combination thereof. Management server 502 may further comprise one or more network interfaces 510 for communicating with host machines 504 and clients 506 via the computer network(s). Network interfaces 510 can include, for example, an Ethernet interface, WiFi interface, cable broadband interface, Bluetooth interface, or combination thereof. In some implementations, network interfaces 510 may provide a portion or all of a network stack, and may include packet processing units, flow controllers, or other such elements. Network interfaces 510 may include hardware, software, or a combination of hardware and software for processing packets and communicating with host machines 504 and clients 506.

Management server 502 may also comprise one or more memory devices 512 for storing instructions and data for one or more computer applications, programs, components, packages, libraries, services, etc. executable by processor 508. A memory device 512 can include, for example, RAM, ROM, a hard drive, or other type of memory device. In the example shown, memory devices 512 can store data and instructions for an application/desktop deployment service 516, a connection brokering service 518, and a power management service 520. Memory devices 512 can also store data and instructions for an operating system (not illustrated) upon which services 516, 518, 520 can execute. The services 516, 518, 520 shown in FIG. 5 are merely illustrative and are not intended to be inclusive of all services that may be provided by a VDI/DaaS management server.

Deployment service 516 can be configured to distribute (or "deliver") applications and desktops to host machines 504. For example, deployment service 516 can configure host machines 504 to use particular images (e.g., virtual machine images) that include a desktop environment (e.g., WINDOWS) and one or more pre-installed applications. As another example, deployment service 516 can cause applications to be streamed across the network to host machines 504, meaning the applications are profiled and delivered to host machines 504 on demand. Various other techniques can be used to distribute desktops and applications to host machines 504.

Connection brokering service 518 can broker connections between end users and their virtual desktops and applications. Brokering service 518 can track various information about virtual application/sessions. For example, for a given session, brokering service 518 can track the date/time of when the session was created, information identifying the user for whom the session was created, information identifying the host machine 504 on which the session is currently running on or is otherwise associated with, information identifying one or more applications running within or otherwise associated with the session, the state of the session (e.g., connected versus disconnected), among various other information. Brokering service 518 can receive requests from clients 506 to access particular virtual application/desktop resources, authenticate end users associated with those requests, assign virtual application/desktop resources on particular host machines 504 to the end users, and provide clients 506 with information necessary to connect (and subsequently reconnect) to their assigned virtual application/desktop resources. When processing a request to accessing a virtual application/desktop resource, brokering service 518 can determine if the user has an existing session associated with that resource and provide the requesting client 506 with information to reconnect to their existing virtual application/desktop session, rather than creating a new session.

Power management service 520 can manage the state of host machines 504, powering them on and off—or otherwise starting and stopping them—based on demand and/or administrative configuration. In general, power management service 520 can auto-scale host machines 504 such that, at any given time, there is sufficient capacity to handle user demand for virtual application/desktop resources but not excess capacity such that there would be a waste of hosting costs and energy usage.

As used herein, the term "capacity" refers to a number of virtual application/desktop sessions that can be supported/hosted by a particular host machine or by a given collection of host machines. The capacity of a particular host machine may be hardcoded within power management service 520, defined as a configuration setting, or determined in a dynamic manner (e.g., based on historical usage data). The capacity of a collection of host machines may be defined as the sum of the capacities of the host machines within the collection. As used herein, the term "load" refers to a value (e.g., a numeric value) representing virtual application/desktop usage on a particular host machine or across a given collection of host machines. For example, load may be expressed as a number of user sessions, processor usage, memory usage, other system metric, or some combination thereof. Load and capacity may be compared directly (e.g., in the case where they are both expressed in terms of numbers of sessions) or indirectly (e.g., by converting between processor usage and number of sessions using a predetermined conversion factor). The term "actual load" refers to a value representing actual virtual application/desktop usage as measured for one or more host machines at a given time or within a given time frame. In some cases, agents (e.g., a VDAs) running on individual host machines can measure actual load and report it to management server 502 on a periodic or continuous basis. The actual load of a collection of host machines may be defined as the sum of the actual loads of the host machines within the collection.

In some embodiments, power management service 520 can, on a periodic or continuous basis, determine an expected load of virtual application/desktop resources based on historic usage data and/or a configurable schedule. For example, for a given hour of the day, day of week, or other time period, power management service 520 can determine expected load as an average of the number of sessions that users have historically initiated during that same time period. As another example, an administrator may configure system 500 to provision for certain numbers of user sessions during certain time periods (e.g., based on the administrator's knowledge of past or future user behavior), and the expected load can be determined based on this configured schedule. In any case, power management service 520 can compare the expected load to the capacity of the powered-on host machines 504 to determine if host machines should be powered on/off. For example, if the expected load is greater than the capacity, power management service 520 can power on additional host machines 504 such that the capacity is greater than or equal to the expected load. If the capacity is significantly greater (e.g., X % greater, where X=5, 10, 15, 20, 25, 50, 75, 100, etc.) than the expected load, power management service 520 can determine that a number, N, of host machines 504 should be powered down such that the resulting capacity is not significantly greater than expected load. For example, it may determine N such that the resulting capacity is greater than the expected load but less than X % greater than the expected load.

In some embodiments, power management service 520 can, on a periodic or continuous basis, compare the actual load on the powered-on host machines 504 to their capacity. If the capacity is significantly greater (e.g., Y % greater, where Y=15, 10, 15, 20, 25, 50, 75, 100, etc.) than the actual load, power management service 520 can determine that a number, N, of host machines 504 should be powered off such that the resulting capacity is not significantly greater than actual load. For example, it may determine N such that the resulting capacity is greater than the actual load but less than X % greater than the actual load.

In some embodiments, power management service 520 may implement some combination of the techniques just described so as to consider both expected load and actual load when auto-scaling host machines 504.

In some embodiments, an administrator may directly configure the number of host machines 504 to run during specific time periods. Here, power management service 520 may power host machines on/off such that the number of running machines equals the number scheduled at a given time. Various other techniques may be used to determine if host machines should be powered on/off.

In the case where power management service 520 determines that a number, N>0, of host machines 504 should be powered down, it may next determine which specific machines to power down. As previously discussed, the stateful nature of virtual application/desktop sessions presents a challenge for automatically powering down host machines and care must be taken to avoid loss of work. In contrast to existing systems, illustrative computer system 500 is designed such that host machines 504 can be powered down in a forceful/aggressive manner without loss of work.

Briefly, and as discussed in more detail below, host machines 504 are configured to automatically persist application state associated with user sessions to shared storage 528 prior to being shutdown, and to restore application state from shared storage 528 when users reconnect to their sessions. This allows, for sessions to be migrated between host machines in a seamless or near-seamless fashion. For example, if a host machine running a user session is powered down, the user can subsequently be reconnected to a different host machine with their session fully restored. In this way, power management service 520 can, in general, shutdown any given host machine 504 at any given time without risk of loss of work. This allows host machines 504 to be powered down in a forceful/aggressive manner without loss of work. System 500 can leverage a feature found on many operating systems (OSs), such as WINDOWS, whereby the OS sends a signal to running applications prior to the host machine shutting down ("shutdown signal"). System 500 can also leverage the capability of many existing applications to save their state to disk in response to such a signal, and to restore the saved state from disk when the application subsequently re-launches.

Shared storage 528 may correspond to an on-prem NAS appliance, an on-prem file share, cloud-based storage, or any other type of storage that can be accessed by (i.e., shared between) different host machines 504. In some embodiments, shared storage 528 can be hosted within the same on-prem/cloud-based system as host machines 504.

In some embodiments, power management service 520 can select the N host machines to power down in a random fashion. In some embodiments, management server 502 may track how long individual ones of the host machines 504 have been running ("uptime") and power management service 520 can select the N host machines to power down based on their uptimes, e.g., the N machines with the longest uptime, the N machines with the shortest uptime, etc.

In some embodiments, power management service 520 may consider load on particular host machines 504 when deciding which host machines to power down. For example, power management service 520 may select the N host machines with the smallest loads to power down.

In some embodiments, power management service 520 may consider the number sessions and/or the state of the sessions running on particular host machines 504 when deciding which host machines to power down. For example, based on an administrative configuration, power management service 520 can select a host machine that has only disconnected/inactive sessions to shutdown rather than a host machine that has connected/active sessions. As another example, power management service 520 may prefer to shutdown a host machine that has fewer connected sessions (e.g., an absolute number of connected sessions, a percentage of total sessions that are connected, etc.) compared to another host machine that has more connected sessions. This can help reduce user disruption and resource usage associated with migrating sessions between host machines. For example, when deciding whether to power down a given host machine, power management service 520 may consider the total number of sessions on that machine and/or the number of connected sessions on that machine.

In some embodiments, power management service 520 may consider the duration of sessions running on particular host machines 504 when deciding which host machines to power down. For example, power management service 520 may prefer to shutdown host machines with sessions that have been running for a relatively long time (e.g., more than a threshold number of minutes, hours, or days).

In some embodiments, power management service 520 may consider which applications are running on particular host machines 504 when deciding which host machines to power down. It is recognized herein that, although many existing applications may be configured to save their state to disk in response to a shutdown signal, not all applications may be so configured. In addition, an organization or particular users may desire to have certain applications exempted from being automatically migrated between host machines 504 (e.g., to avoid any possible disruption). Thus, in some embodiments, management server 502 may allow certain applications to be exempted from migration and power management service 520 may avoid powering down a host machine 504 if it has any sessions running these applications. For example, management server 502 may store or otherwise have access to a list of exempted applications that can be configured on a per-user basis, a per-organization basis, or across organizations. In some embodiments, management server 502 may allow clients 506 to request that certain applications be exempted from power-off actions. For instance, a client 506 may be configured to send an application exemption request to management server 502 using an API provided thereby, where the request includes information for identifying one or more applications to be exempted from power-off actions.

In some embodiments, management server 502 may allow clients 506 to request that their sessions be exempted from power-off actions. For instance, a client 506 may be configured to send a session exemption request to management server 502 using an API provided thereby, where the request includes information for identifying the client/user/session and, optionally, a period of time for which to exempt the session from power-off actions (i.e., how long to "extend" the session). Management server 502 can decide whether to grant a session exemption request based on one or more factors such as which applications are running within the session, the load on the host machine where the session is running, time of day, etc. In some embodiments, session exemptions may be granted for a limited amount of time. For example, management server 502 can, by default, extend sessions for a predetermined period of time (e.g., 1 hour, 2 hours, 3 hours, 6 hours, etc.). As another example, the period of time may be specified by a client 506 as part of the exemption request. Power management service 520 can honor session exemptions by choosing to not power off a host machine 504 if it has any sessions for which an exemption has been granted.

Various other power management exceptions/exemptions can be implemented by management server 502. For example, based on historical usage data, it can be determined that sessions involving a particular user and/or a particular application should be exempted from power down actions during certain days of the week, times of the day, etc.

In some embodiments, management server 502 may allow administrators to request that specific host machines 504, or certain numbers of host machines, be immediately powered on/off, or be powered on/off at a specific time. Such requests are referred to here as "on demand requests." Management server 502 may provide an interface (e.g., a web-based UI or an API) that can be accessed by computing devices of administrator to issue on demand requests In response to receiving such power management requests/commands In addition to the above examples, various other VDI/DaaS power management schemes are made possible by the techniques and structures disclosed herein. Embodiments of the present disclosure provide system administrators with many options to fine-tune their power management schemes and provides methods for preserving user work during forced power-off scenarios in a VDI/DaaS environment.

Management server 502 can include, or otherwise have access to, a database 514 configured to store various types of information for delivering virtual applications and desktops. Database 514 may be internal to management server 502 (e.g., an internal hard drive) or external thereto (e.g., an external hard drive, network storage, cloud-based storage, etc.). As illustrated in FIG. 5, database 514 can store configuration data 522, user authentication data 524, session data 526, and host data 527. The data 522, 524, 526, 527 shown in FIG. 5 are not intended to be inclusive of all data that can be stored within or used by a virtual application/desktop management server.

Configuration data 522 can include various settings, policies, and other types of configuration data used by services 516, 518, 520 for providing access to virtual applications and desktops. Notably, configuration data 522 can include power management settings/policies used by power management service 520 to automatically power manage host machines 504. For example, configuration data 522 can include an auto-scaling policy that specifies the minimum and/or maximum number of host machines 504 that should be available (e.g., powered on) during certain periods of time (e.g., hours of the day, days of the week, etc.). As another example, configuration data 522 can include an auto-scaling policy that specifies the expected load (e.g., expected number of user sessions) during certain time periods. In some embodiments, configuration data 522 can include one or more lists of applications that are exempted from being powered down. In some cases, a list of exempted applications may be associated with a particular organization and/or user.

Authentication data 524 can include data used by connection brokering service 518 to authenticate end users prior to providing those users with access to virtual applications/desktops on host machines 504. For example, for a given end user, authentication data 524 can include an email address or other user identifier, and a password (or a hashed representation thereof). Various other types of authentication data could be used.

Session data 526 can include data about virtual application/desktop sessions that are actively being hosted on host machines 504 and, in some cases, data about historical sessions. For a given session, session data 526 can include, for example, the date/time of when the session was created, data identifying the user for whom the session was created, data identifying the host machine 504 on which the session is currently running on or is otherwise associated with, data identifying one or more applications running within or otherwise associated with the session, the state of the session (e.g., connected versus disconnected), and/or data about power-management exemptions requested/granted for the session. Some or all of the stored session data 526 can be utilized by power management service 520 to select which host machines 504 to power on/off.

Host data 527 can include data about virtual host machines 504 that are available for use in delivering virtual applications and desktops. For example, for a given host machine 504, host data 527 may include network address data (e.g., IP address, port, etc.) that can be used by management server 502 and clients 506 to connect to the host machine via a computer network, data indicating the status of the machine (e.g., powered on versus powered off), the date/time the machine was powered on, data indicating current load on the machine (e.g., as reported by an agent running on the host machine), historical load on the machine, etc. Host data 527 can also include, for a given host machine, information about which OS is installed on the host machine, which applications are installed or otherwise available to be run on the host machine, the machine's processor type, memory capacity, disk capacity, and other machine specifications. Some or all of the stored host data 527 can be utilized by power management service 520 to select which host machines 504 to power on/off.

In some embodiments, particular items of data (e.g., records or objects) stored within database 514 may be linked to or otherwise associated with particular organizations. That is, database 514 may be configured to store data for multiple different organizations.

Although components are shown internal to management server 502, in some embodiments, one or more components may be external to management server 502 (e.g., an external display or input device, external memory devices for data storage, etc.).

Clients 506 can may store and be configured to execute one or more applications for communicating with management server 502 and accessing virtual applications and desktops on host machines 504. For example, a particular client 506 may include an embedded browser or remote desktop application for accessing applications/desktops hosted on host machines 504. Clients 506 can include various types and forms of computing devices executing on behalf of end users, such as desktop computers, laptop computers, tablet computers, smartphones, workstations, etc.

In some embodiments, clients 506 can be configured to present one or more user interface (UI) controls for requesting that particular applications or particular virtual desktop/application sessions be exempted from power-off actions. For example, clients 506 may be configured present a button labeled "Extend Session" and, in response to an input thereon, may send a session exemption request to management server 502.

In some embodiments, clients 506 may be configured to detect when a virtual application/desktop session has been migrated between host machines 504 and, in response, can present a notification via a user interface. For example, when a client 506 reconnects to a virtual application/desktop resource, it can compare the host connection information returned by management server 502 to the connection information previously returned by management server 502 for the same resource. If the connection information is different, the client 506 can notify the user that their session has migrated to a new host machine.

Figure 6:
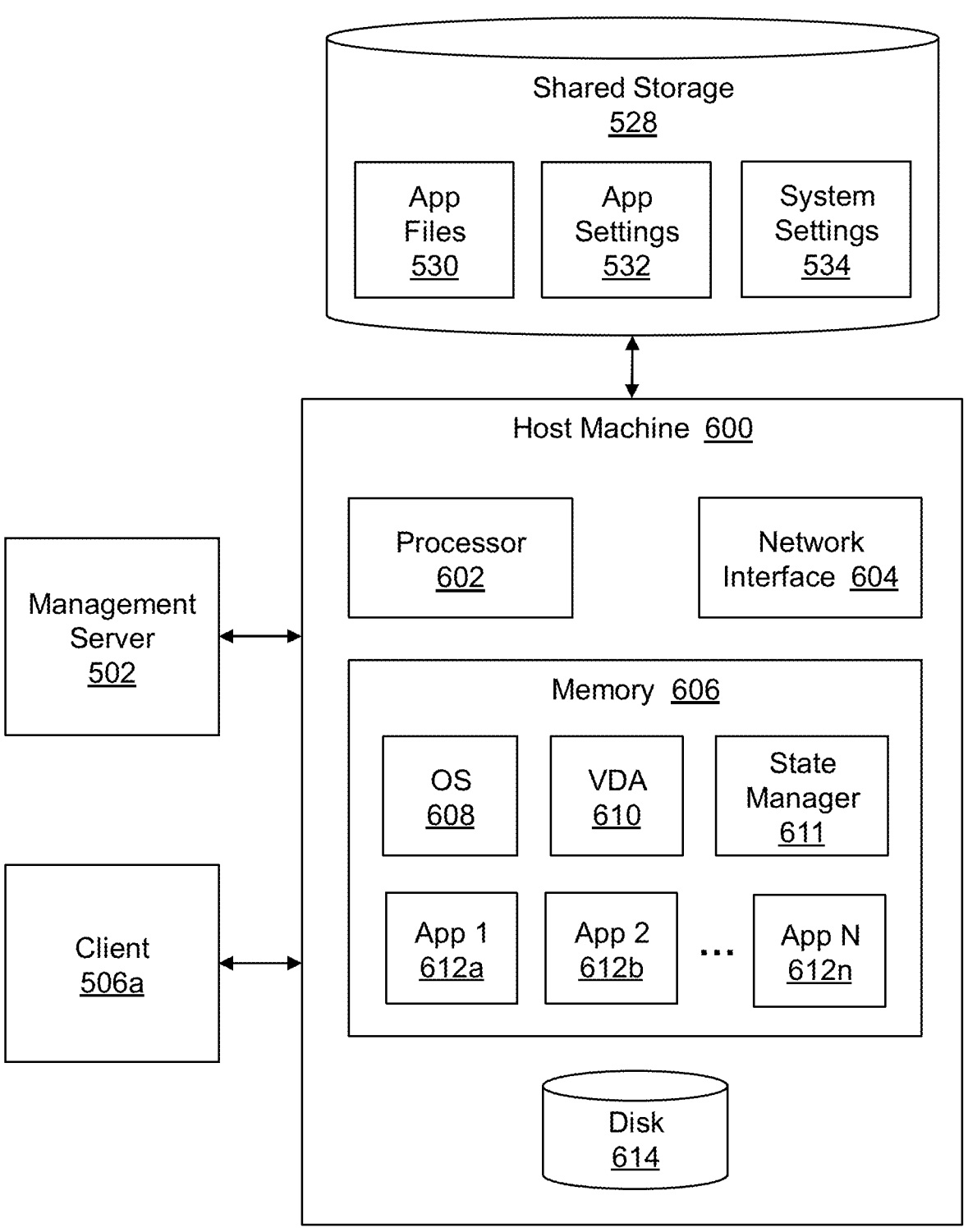
FIG. 6 is a block diagram of an illustrative host machine that may be provided within the computer system of FIG. 5, according to some embodiments.

FIG. 6 shows illustrative host machine 600 that may be provided within the computer system of FIG. 5, according to some embodiments. That is, host machine 600 may correspond to any of the host machines 504 in FIG. 5. Like elements in FIGS. 5 and 6 are shown using like reference numerals.

Host machine 600 may comprise one or more processors 602, which may comprise, for example, single core processors, multi-core processors, virtual processors provided as part of a virtual machine executed by one or more physical machines, graphics processing units (GPUs), or combination thereof. Host machine 600 may further comprise one or more network interfaces 604 for communicating with management server 502, a client 506a, and shared storage 528 via one or more computer network(s). Network interfaces 604 can include, for example, an Ethernet interface, WiFi interface, cable broadband interface, Bluetooth interface, or combination thereof. In some implementations, network interfaces 604 may provide a portion or all of a network stack, and may include packet processing units, flow controllers, or other such elements. Network interfaces 604 may include hardware, software, or a combination of hardware and software for processing packets and communicating with management server 502, client 506a, and shared storage 528.

Host machine 600 may also comprise one or more memory devices 606 for storing instructions and data for one or more computer applications, programs, components, packages, libraries, services, etc. executable by processor 602. A memory device 606 can include, for example, RAM, ROM, a hard drive, or other type of memory device. In the example shown, memory devices 606 can store data and instructions for an OS 608, along with a virtual delivery agent (VDA) 610, a state manager 611, and one or more applications 612a, 612b, . . . , 612n (612 generally). Client 506a can access a single application 612 ("virtual application") running on host machine 600 or multiple applications 612 using a desktop environment ("virtual desktop") provided by OS 608. The components of host machine 600 shown in FIG. 6 are merely illustrative and are not intended to be inclusive of all services that may be provided by virtual application/desktop host machine.

OS 608 can generally be any OS that provides a mechanism for signaling to applications 612 prior to the host machine 600 shutting down. For example, WINDOWS provides an application programming interface (API) which applications can use to register a handler function for saving application state in response to a shutdown event. Conventionally, with OS's that provide such signaling, applications 612 may be limited to saving their state on the host machine, such as to a local disk 614. In contrast, embodiments of the present disclosure can leverage such signaling capability to save application state to shared storage 528, as discussed further below.

VDA 610 can interoperate with the management server 502 to provide virtual applications and desktops to client 506a. For example, VDA 610 may be configured to register the host machine 600 with the management server 502, manage connections between the host machine 600 and the client 506a, communicate session information to management server 502, communicate operating system metrics of the host machine (e.g., processor usage, memory usage, disk usage, etc.) to management server 502, and/or perform various other VDI/DaaS-related functions. VDA 610 can report which applications 612 are running within a given user session to management server 502, which information can be used to make power management decisions, as previously discussed.

State manager 611 is operable to configure host machine 600 such that the application state associated with particular user sessions is automatically saved to shared storage 528 prior to shutdown and automatically restored from shared storage 528 when users reconnect to their sessions (including sessions potentially started on a different, but similarly configured, host machine). In the example of FIG. 6, state manager 611 can cause, for a given session, application files 530, application settings 532, and system settings 534 to be automatically saved to, and retrieved from, shared storage 528. Application files 530 can, for example, include any files created modified during a user session. Application settings 532 can include various settings that affect the appearance, functionality, and other behavior of particular applications accessed during a user session. System settings 534 can include various system-wide settings associated a session, such as a desktop color scheme that is applied to various different applications. In some embodiments, application settings 532 and/or system settings 534 can include WINDOWS registry settings.

In some embodiments, state manager 611 may utilize a profile management tool to cause application files 530 and settings 532, 534 to be saved in shared storage 528. For example, in some embodiments, CITRIX User Profile Management (UPM) may be used. UPM enables organizations to save and deliver users' files and settings across user sessions on different devices and provides central management for employee-specific data and settings stored in profiles.

In some embodiments, state manager 611 may leverage profile management functionality provided by the OS 608. For example, state manager 611 may utilize the Folder Redirection and Roaming User Profile features of WINDOWS. Folder Redirection enables the path of a known folder (such as a user's Documents folder) to be redirected to a new location, where the new location can be a folder on the local computer or a directory on a file share. Users interact with files in the redirected folder as if it still existed on the local drive. Roaming User Profiles redirects user profiles to a file share so that users receive the same system and application settings on multiple computers. When a user signs in to a computer by using an account that is set up with a file share as the profile path, the user's profile is downloaded to the local computer and merged with the local profile (if present). When the user signs out of the computer, the local copy of their profile, including any changes, is merged with the remote copy of the profile.

It is appreciated herein that utilizing a profile management tool—such as UPM or Roaming User Profiles—on host machines enables various power management techniques to be employed which would otherwise not be possible without loss of work. For example, as previously discussed, embodiments of the present disclosure enable administrators to aggressively power down machines and to implement auto-scaling without loss of work, while providing exemptions for certain applications and/or sessions.

In some embodiments, state manager 611 may configure host machine 600 such that all files and registry settings that are bound for the local file system (e.g., disk 614) are redirected to shared storage 528. In some embodiments, state manager 611 may monitor which files and registry settings are created/modified by applications 612 and can copy/send those files and settings to shared storage 528. In some embodiments, state manager 611 may analyze how particular applications 612 respond to shutdown events generated by the OS 608 and, based on this analysis, may determine which folders should be redirected to shared storage 528 and which registry settings should be copied to shared storage 528.

State manager 611 may configure such profile management, for example, when host machine 600 starts up and/or when a user logs into host machine 600. In some embodiments, roaming profiles can be configured via user policies.

Applications 612 can include various types of applications such as word processing applications, spreadsheet applications, image editing applications, etc. Some or all of applications 612 may be configured to save their state in response to a shutdown signal generated by OS 608.

Figure 7:
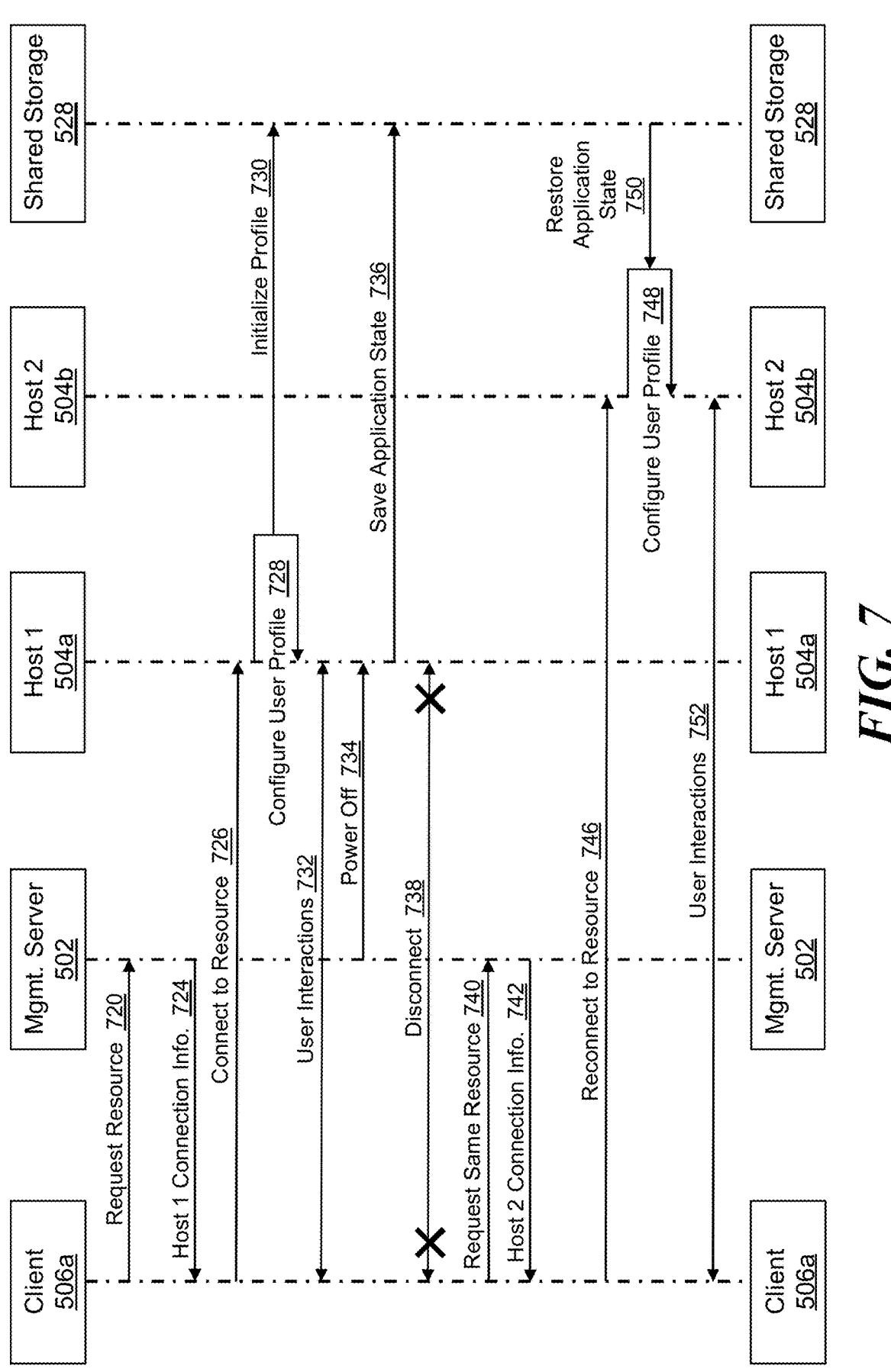
FIG. 7 is an interaction diagram illustrating how the components of the computer system of FIG. 5 may be configured to interact with each other, according to some embodiments.

FIG. 7 shows an example of how the components of the computer system of FIG. 5 may be configured to interact with each other, according to some embodiments. The interactions show and described are merely illustrative and not intended to be a complete representation of interactions that can occur in the system of FIG. 5.

At line 720, a client 506a can send a request to management server 502 for a virtual application/desktop resource. Management server 502 can determine that the user of client 506a does not have an existing session for the requested resource and thus may select an available host machine. In some embodiments, management server 502 may select the host machine based on one or more factors such as which OS is installed, which applications are installed, processor type, memory capacity, etc. In the example shown, management server 502 selects first host machine 504a and, at line 724, and returns information (e.g., hostname, IP address, port, connection parameters, etc.) for the client 506a to connect to the resource on the first host machine 504a.

At line 726, client 506a can connect to the virtual application/desktop resource running on first host machine 504a. The user can be logged into the host machine, starting a new session. In response, at line 728, first host machine 504a can configure user profile management for the session to cause application state to be saved to shared storage 528. In some embodiments, as indicated by line 730, this can include initializing a user profile on shared storage 528.

At line 732, client 506a can interact with the virtual application/desktop resource on first host machine 504a using a remoting protocol such as Independent Computing Architecture (ICA) remoting protocol, HDX, or Remote Desktop Protocol (RDP). Such interactions can cause a change in application state associated with the session. For example, using the virtual application/desktop, a user may create new documents, edit existing documents, resize application windows, change their desktop background, etc.

At line 734, management server 502 may send a power off command to first host machine 504a. Management server 502 can decide to power off first host machine 504a using any of the power management techniques described above in the context of FIG. 5. For example, management server 502 may select first host machine 504a to be powered down in response to an administrator's request and/or based on one or more auto-scaling factors such as the number of connected/disconnected sessions on that host, which applications are running on that host, time of day, day of week, load, uptime, etc.

At line 736, application state associated with the session may be automatically saved to shared storage 528 as a result of the previously configured user profile. In some cases, an OS of the first host machine 504 may generate a shutdown signal in response to receiving the power off command and one or more applications associated with the session may automatically save their state to shared storage 528 in response to receiving the shutdown signal.

At indicated by line 738, client 506a can be automatically disconnected from the first host machine 504a as a result of the shutdown. In other cases, client 506a may manually disconnect from the host machine before it is powered down, e.g., in response to a user input. In either case, the session is said to be disconnected.

At line 740, client 506*a* may send another request to management server 502 to resume the session. That is, client 506*a* may send a request to management server 502 to access the same virtual application/desktop resource previously requested (i.e., at line 720). In response, management server 502 can determine that the session is assigned to a powered-down host machine (i.e., first host machine 504*a*) and, thus, may select a different host machine for the session. In the example shown, management server 502 selects second host machine 504*b*. In some embodiments, management server 502 may select another host machine based on one or more factors such as which OS is installed, which applications are installed, processor type, memory capacity, etc. At line 742, management server 502 can send client 506*a* information for connecting to the virtual application/desktop resource on the second host machine 504*b*.

At line 746, client 506*a* can connect to the virtual application/desktop resource running on second host machine 504*b*.

At line 748, the second host machine 504*b* can configure the profile management for the session user. This can involve restoring the previously saved application state from shared storage 528, as indicated by line 750. If one or more applications were previously opened for the session, those one or more applications can be automatically launched to have the same state as on the first host machine 504*a*. For example, any documents that were previously being worked on can be loaded within the application(s).

Figure 8:
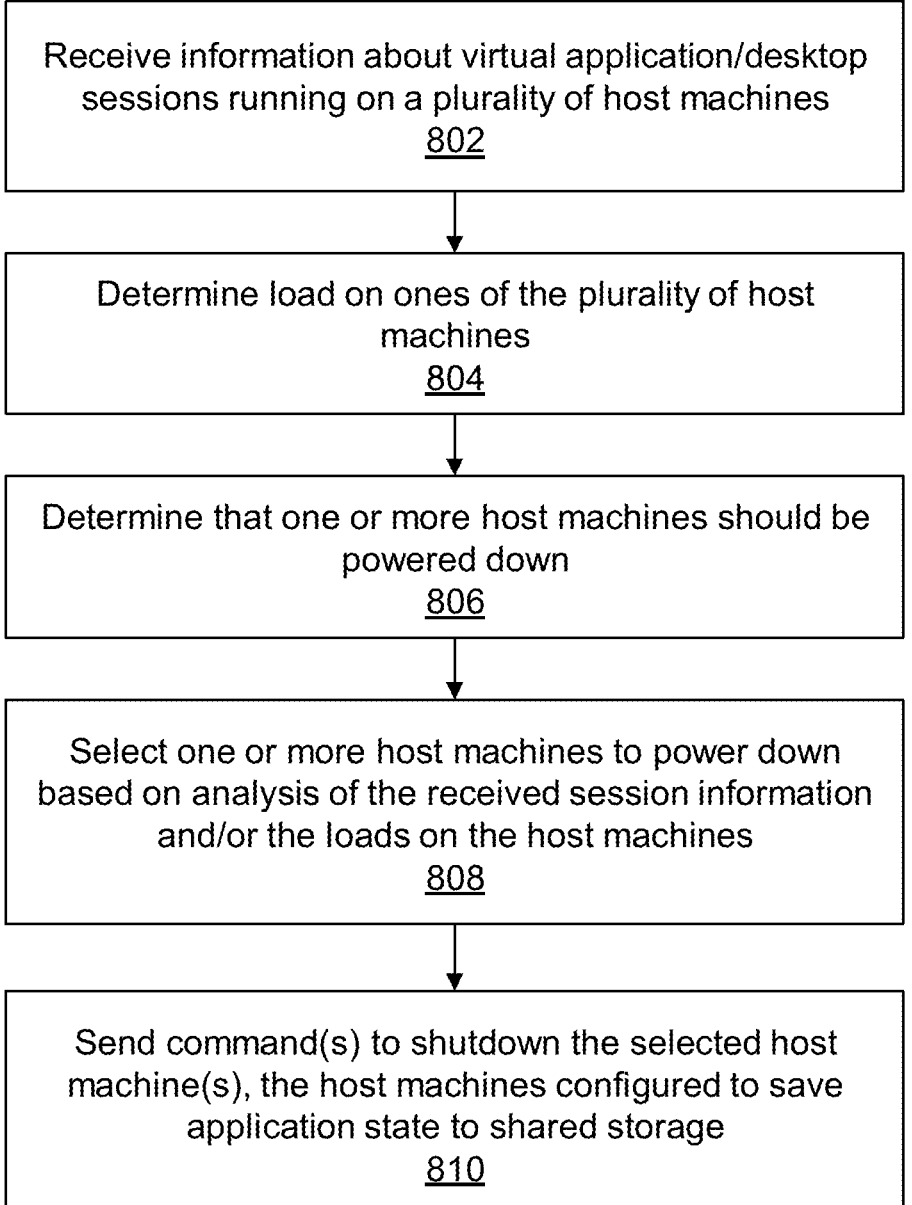
FIG. 8 is a flow diagram showing processing that can occur within the computer system of FIG. 5, according to some embodiments.

FIG. 8 shows an illustrative process 800 that can be implemented and/or executed within the computer system of FIG. 5, according to some embodiments. For example, process 800 may be executed within management server 502 of FIG. 5.

A block 802, information about virtual application/desktop sessions running on a plurality of host machines is received. For a given session, the received information can include, for example, the state of the session (e.g., connected versus disconnected), information identifying the applications running within the session, the date/time the session was created, information identifying the session user, and whether a request to extend the session was granted. In some embodiments, the session information may be received from VDAs running on the host machines. In some embodiments, the session information may be received from a database of the management server.

A block 804, load on individual ones of the plurality of host machines is determined. For example, for a given host machine, load may be determined based on processor usage, memory usage, or another system metric as reported by a VDA running thereon. In some embodiments, load may be determined indirectly based on the number sessions running on a host machine.

At block 806, the management server determines that one or more host machines should be power down. Any of the techniques previously described can be used to make this determination. For example, the management server can determine to power down machines according to an auto-scaling schedule, based on a comparison of expected load to capacity, based on a comparison of actual load to capacity, or based on a administrative request to scale down the number of host machines.

At block 808, one or more host machines are be selected to be powered down. The machines may be selected based on an analysis of the session information received at block 802 and/or based on the host machine loads determined at block 804. Any of the techniques previously described for selecting which particular host machines to powered down may be used. For example, a host machine with zero sessions or with zero connected sessions (i.e., having only sessions in a disconnected state) may be selected to be powered down. As another example, a host machine may be selected for shutdown unless it is running an application that is exempted from shutdown. As another example, a host machine may be selected for shutdown unless it is running a session that is exempted from shutdown.

At block 810, shutdown commands are sent to the selected host machines. The host machines can be configured to automatically save their application state to shared storage prior to powering down, such as using the structures and techniques described above in the context of FIG. 6. In this way, the selected host machines can be shutdown without loss of work.

The following examples pertain to further embodiments, from which numerous permutations and configurations will be apparent.

Example 1 includes a method including: receiving, by a first computing device, information about one or more applications running on a second computing device, the second computing device being one of a plurality of computing devices managed by the first computing device; determining, by the first computing device, whether to power down the second computing device based at least on an analysis of the information about the one or more applications; and responsive to a determination to shutdown the second computing device, sending, by the first computing device, a command to shutdown the second computing device, wherein the second computing device is configured to save state of the one or more applications to a storage device accessible to the plurality of computing devices.

Example 2 includes the subject matter of example 1, wherein the information about the one or more applications running on the second computing device includes identifiers of the one or more applications, wherein determining whether to power down the second computing device includes comparing the application identifiers to a list of application identifiers.

Example 3 includes the subject matter of example 2, wherein the list of application identifiers includes identifiers of applications for which the second computing device is able to save state.

Example 4 includes the subject matter of example 2, wherein the list of application identifiers includes identifiers of applications for which the second computing device is unable to save state.

Example 5 includes the subject matter of any of examples 1-4, wherein determining whether to power down the second computing device is further based on a time of day.

Example 6 includes the subject matter of any of examples 1-5 and further includes: determining, by the first computing device, a load of the second computing device, wherein determining whether to power down the second computing device is further based on the load of the second computing device.

Example 7 includes the subject matter of any of examples 1-6 and further includes: determining, by the first computing device, states of one or more sessions running on the second computing device, wherein determining whether to power down the second computing device is further based on the states of the one or more sessions running on the second computing device.

Example 8 includes the subject matter of any of examples 1-7 and further includes: receiving, by the first computing device, a request to extend a session hosted on a third computing device from the plurality of computing devices;

and responsive to receiving the request to extend the session, determining, by the first computing device, not to power down the third computing device.

Example 9 includes the subject matter of any of examples 1-8, wherein at least one of the one or more applications is associated with a session, the method further including: receiving a request to access the at least one of the one or more applications; and sending a command to access the at least one of the one or more applications on a third computing device of the plurality of computing devices, the third computing device configured to restore the state of the at least one of the one or more applications saved on the storage device.

Example 10 includes a server device including a processor a non-volatile memory storing computer program code that when executed on the processor causes the processor to execute a process including: receiving information about one or more applications running on a host machine, the host machine being one of a plurality of a host machines managed by the server device; determining whether to power down the host machine based at least on an analysis of the information about the one or more applications; and responsive to a determination to shutdown the host machine, sending a command to shutdown the host machine, wherein the host machine is configured to save state of the one or more applications to a storage device accessible to the plurality of host machines.

Example 11 includes the subject matter of example 10, wherein the information about the one or more applications running on the host machine includes identifiers of the one or more applications, wherein determining whether to power down the host machine includes comparing the application identifiers to a list of application identifiers.

Example 12 includes the subject matter of example 11, wherein the list of application identifiers includes identifiers of applications for which the host machine is able to save state.

Example 13 includes the subject matter of example 11, wherein the list of application identifiers includes identifiers of applications for which the host machine is unable to save state.

Example 14 includes the subject matter of any of examples 10-13, wherein determining whether to power down the host machine is further based on a time of day.

Example 15 includes the subject matter of any of examples 10-14, the process further including: determining a load of the host machine, wherein determining whether to power down the host machine is further based on the load of the host machine.

Example 16 includes the subject matter of any of examples 10-15, the process further including: receiving a request to extend a session hosted on another host machine from the plurality of host machines; and responsive to receiving the request to extend the session, determining not to power down the another host machine.

Example 17 includes the subject matter of any of examples 10-16, wherein at least one of the one or more applications is associated with a session, the process further including: receiving a request to access the at least one of the one or more applications; and sending a command to access the at least one of the one or more applications on another host machine of the plurality of host machines, the another host machine configured to restore the state of the at least one of the one or more applications saved on the storage device.

Example 18 includes a non-transitory machine-readable medium encoding instructions that when executed by one or more processors cause a process to be carried out, the process including: receiving, by a first computing device, information about one or more applications running on a second computing device from a plurality of computing devices managed by the first computing device; determining, by the first computing device, whether to power down the second computing device based at least on an analysis of the information about the one or more applications; and responsive to a determination to shutdown the second computing device, sending, by the first computing device, a command to shutdown the second computing device, wherein the second computing device is configured to save state of the one or more applications to a storage device accessible to the plurality of computing devices.

Example 19 includes the subject matter of example 18, wherein the information about the one or more applications running on the second computing device includes identifiers of the one or more applications, wherein determining whether to power down the second computing device includes comparing the application identifiers to a list of application identifiers.

Example 20 includes the subject matter of example 17 or 18, the process further including: determining, by the first computing device, a load of the second computing device, wherein determining whether to power down the second computing device is further based on the load of the second computing device.

The subject matter described herein can be implemented in digital electronic circuitry, or in computer software, firmware, or hardware, including the structural means disclosed herein and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or another unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this disclosure, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of nonvolatile memory, including by ways of example semiconductor memory devices, such as EPROM, EEPROM, flash memory device, or magnetic disks. The processor and the memory can be supplemented by, or incorporated in, special purpose logic circuitry.

In the foregoing detailed description, various features are grouped together in one or more individual embodiments for the purpose of streamlining the disclosure. This method of disclosure is not to be interpreted as reflecting an intention that each claim requires more features than are expressly recited therein. Rather, inventive aspects may lie in less than all features of each disclosed embodiment.

References in the disclosure to "one embodiment," "an embodiment," "some embodiments," or variants of such phrases indicate that the embodiment(s) described can include a particular feature, structure, or characteristic, but every embodiment can include the particular feature, structure, or characteristic. Moreover, such phrases are not necessarily referring to the same embodiment(s). Further, when a particular feature, structure, or characteristic is described in connection knowledge of one skilled in the art to affect such feature, structure, or characteristic in connection with other embodiments whether or not explicitly described.

The disclosed subject matter is not limited in its application to the details of construction and to the arrangements of the components set forth in the following description or illustrated in the drawings. The disclosed subject matter is capable of other embodiments and of being practiced and carried out in various ways. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

All publications and references cited herein are expressly incorporated herein by reference in their entirety.

The invention claimed is:

1. A method comprising:
receiving, by a first computing device, information about one or more applications running on a second computing device, the second computing device being one of a plurality of computing devices managed by the first computing device;

determining, by the first computing device, whether to power down the second computing device based at least on an analysis of the information about the one or more applications; and responsive to a determination to power down the second computing device, sending, by the first computing device, a command to shutdown the second computing device, wherein the second computing device is configured to save state of the one or more applications to a storage device accessible to the plurality of computing devices;

wherein the information about the one or more applications running on the second computing device includes identifiers of the one or more applications, wherein determining whether to power down the second computing device includes comparing the application identifiers to a list of application identifiers.

2. The method of claim 1, wherein the list of application identifiers includes identifiers of applications for which the second computing device is able to save state.

3. The method of claim 1, wherein the list of application identifiers includes identifiers of applications for which the second computing device is unable to save state.

4. The method of claim 1, wherein determining whether to power down the second computing device is further based on a time of day.

5. The method of claim 1, further comprising:
determining, by the first computing device, a load of the second computing device,
wherein determining whether to power down the second computing device is further based on the load of the second computing device.

6. The method of claim 1, further comprising:
determining, by the first computing device, states of one or more sessions running on the second computing device,
wherein determining whether to power down the second computing device is further based on the states of the one or more sessions running on the second computing device.

7. The method of claim 1, further comprising:
receiving, by the first computing device, a request to extend a session hosted on a third computing device from the plurality of computing devices; and
responsive to receiving the request to extend the session, determining, by the first computing device, not to power down the third computing device.

8. The method of claim 1, wherein at least one of the one or more applications is associated with a session, the method further comprising:
receiving a request to access the at least one of the one or more applications; and
sending a command to access the at least one of the one or more applications on a third computing device of the plurality of computing devices, the third computing device configured to restore the state of the at least one of the one or more applications saved on the storage device.

9. A server device comprising:
a processor; and
a non-volatile memory storing computer program code that when executed on the processor causes the processor to execute a process comprising:
receiving information about one or more applications running on a host machine, the host machine being one of a plurality of a host machines managed by the server device;

determining whether to power down the host machine based at least on an analysis of the information about the one or more applications; and responsive to a determination to power down the host machine, sending a command to shutdown the host machine, wherein the host machine is configured to save state of the one or more applications to a storage device accessible to the plurality of host machines;

wherein the information about the one or more applications running on the host machine includes identifiers of the one or more applications, wherein determining whether to power down the host machine includes comparing the application identifiers to a list of application identifiers.

10. The server device of claim 9, wherein the list of application identifiers includes identifiers of applications for which the host machine is able to save state.

11. The server device of claim 9, wherein the list of application identifiers includes identifiers of applications for which the host machine is unable to save state.

12. The server device of claim 9, wherein determining whether to power down the host machine is further based on a time of day.

13. The server device of claim 9, the process further comprising:

determining a load of the host machine, wherein determining whether to power down the host machine is further based on the load of the host machine.

14. The server device of claim 9, the process further comprising:

receiving a request to extend a session hosted on another host machine from the plurality of host machines; and responsive to receiving the request to extend the session, determining not to power down the another host machine.

15. The server device of claim 9, wherein at least one of the one or more applications is associated with a session, the process further comprising:

receiving a request to access the at least one of the one or more applications; and sending a command to access the at least one of the one or more applications on another host machine of the plurality of host machines, the another host machine configured to restore the state of the at least one of the one or more applications saved on the storage device.

16. A non-transitory machine-readable medium encoding instructions that when executed by one or more processors cause a process to be carried out, the process comprising:

receiving, by a first computing device, information about one or more applications running on a second computing device from a plurality of computing devices managed by the first computing device;

determining, by the first computing device, whether to power down the second computing device based at least on an analysis of the information about the one or more applications; and responsive to a determination to power down the second computing device, sending, by the first computing device, a command to shutdown the second computing device, wherein the second computing device is configured to save state of the one or more applications to a storage device accessible to the plurality of computing devices;

wherein the information about the one or more applications running on the second computing device includes identifiers of the one or more applications, wherein determining whether to power down the second computing device includes comparing the application identifiers to a list of application identifiers.

17. The non-transitory machine-readable medium of claim 16, the process further comprising:

determining, by the first computing device, a load of the second computing device, wherein determining whether to power down the second computing device is further based on the load of the second computing device.

* * * * *